United States Patent
Li et al.

(10) Patent No.: US 9,209,951 B2
(45) Date of Patent: Dec. 8, 2015

(54) METHOD OF HANDLING TONE MAP INTERPOLATION AND RELATED COMMUNICATION DEVICE

(75) Inventors: Yuan-Hwa Li, Hsinchu County (TW); Yi-Hung Chen, Hsinchu County (TW)

(73) Assignee: ECONET (Suzhou) Limited, Suzhou, Jiangsu Province (CN)

( * ) Notice: Subject to any disclaimer, the term of this patent is extended or adjusted under 35 U.S.C. 154(b) by 588 days.

(21) Appl. No.: 13/194,997

(22) Filed: Jul. 31, 2011

(65) Prior Publication Data

US 2012/0134430 A1 May 31, 2012

Related U.S. Application Data (60) Provisional application No. 61/417,226, filed on Nov. 25, 2010.

(51) Int. Cl.
*H04L 27/28* (2006.01)
*H04L 5/00* (2006.01)

(52) U.S. Cl.
CPC .............. *H04L 5/0046* (2013.01); *H04L 5/006* (2013.01); *H04L 5/0007* (2013.01); *H04L 5/0042* (2013.01)

(58) Field of Classification Search
CPC .............. H04L 25/0204; H04L 5/0048; H04L 27/2613; H04L 27/28; H04L 12/26; H04L 27/00; H04B 3/46; H04B 17/00; H04K 1/10
USPC ......... 375/219, 260, 267, 295, 296, 220, 257, 375/224, 227, 240.14, 259, 350; 370/330, 370/329, 400, 537, 468, 208, 236, 343; 714/701, 446, 450; 455/446, 450
See application file for complete search history.

(56) References Cited

U.S. PATENT DOCUMENTS

| | | | |
|---|---|---|---|
| 7,388,925 B2 | 6/2008 | Peeters | |
| 7,844,005 B2 * | 11/2010 | Koga et al. | 375/260 |
| 8,121,202 B2 * | 2/2012 | Koga et al. | 375/259 |
| 8,179,953 B2 * | 5/2012 | Honta | 375/224 |
| 8,428,606 B1 * | 4/2013 | Vrzic et al. | 455/450 |
| 2001/0005395 A1 | 6/2001 | Jin | |
| 2007/0109971 A1 * | 5/2007 | Yoshida et al. | 370/236 |
| 2007/0230599 A1 | 10/2007 | Koga | |
| 2007/0242763 A1 | 10/2007 | Li | |
| 2008/0056183 A1 | 3/2008 | Gorokhov | |
| 2008/0273583 A1 * | 11/2008 | Song et al. | 375/224 |
| 2009/0154418 A1 | 6/2009 | Kang | |

(Continued)

FOREIGN PATENT DOCUMENTS

| | | |
|---|---|---|
| CN | 1308439 A | 8/2001 |
| CN | 1545320 A | 11/2004 |

(Continued)

*Primary Examiner* — Charles C Jiang
*Assistant Examiner* — Wali Butt
(74) *Attorney, Agent, or Firm* — Winston Hsu; Scott Margo (57) ABSTRACT

A method of determining a tone-specific information with a tone index for a transmitter or a receiver in a communication system is disclosed. The method comprises selecting at least one base tone index from a plurality of base tone indices according to at least one relation between the tone index and the at least one base tone index, and generating the tone allocation according to at least one base tone allocation with the at least one base tone index of a plurality of base tone allocations, and the at least one relation between the tone index and the at least one base tone index; wherein a base tone map comprises the plurality of base tone indices and the plurality of base tone allocations.

28 Claims, 11 Drawing Sheets

(56) References Cited

U.S. PATENT DOCUMENTS

| | | | |
|---|---|---|---|
| 2010/0208834 A1* | 8/2010 | van Zelst et al. | 375/267 |
| 2010/0316140 A1* | 12/2010 | Razazian et al. | 375/257 |
| 2012/0327868 A1* | 12/2012 | Taghavi Nasrabadi et al. | 370/329 |

FOREIGN PATENT DOCUMENTS

| | | |
|---|---|---|
| CN | 1728695 A | 2/2006 |
| CN | 101521849 A | 9/2009 |
| CN | 101101755 B | 4/2011 |
| TW | 200810456 | 2/2008 |

* cited by examiner

METHOD OF HANDLING TONE MAP INTERPOLATION AND RELATED COMMUNICATION DEVICE

CROSS REFERENCE TO RELATED APPLICATIONS

This application claims the benefit of U.S. Provisional Application No. 61/417,226, filed on Nov. 25, 2010 and entitled "TONE MAP INTERPOLATION", the contents of which are incorporated herein in their entirety.

BACKGROUND OF THE INVENTION

1. Field of the Invention

The present invention relates to a method used in a communication system and related communication device, and more particularly, to a method of handling tone map interpolation in a communication system and related communication device.

2. Description of the Prior Art

A modern high-speed communication system, e.g. asymmetric digital subscriber line (ADSL) system or power line communication (PLC) system, usually employs orthogonal frequency-division multiplexing (OFDM) or discrete multi-tone modulation (DMT) technologies for transmitting and receiving signals. The OFDM and DMT systems usually allocate different number of bits of each sub-carrier to maximally utilize the channel capacity of a stationary channel. The allocation is described in a tone map. Generally speaking, the tone map can refer to the per-tone mapping of any carrier-dependent information. The design of tone maps has been a tradeoff point between channel efficiency and implementation complexity.

One factor that affects implementation complexity is the size and the amount of tone maps. The size of a tone map grows with the number of tones (which is the frequency resolution) and the bit resolution. For a stationary channel, such as the phone line in an ADSL system, one tone map is enough to describe the channel characteristics. Instead, power line is a cyclostationary channel that channel characteristics vary over AC cycles. To fully utilize the cyclostationary channel, the tone map has to be changed cyclically over time. The time resolution of tone maps adds another dimension of complexity. For a networking system over a shared medium, such as PLC, a station can have multiple links with other stations and have to manage a set of tone maps for each link. As a summary, the total size of tone maps grows with the bit resolution, the frequency resolution, the time resolution, and the number of links. High-resolution tone maps cost large tone map storage, management overhead, and communication overhead.

Further, the period of tone maps affects performance in contradicting ways for MAC and PHY if a packet is assumed to use the same tone map over time. For example, long period results in low PHY data rate, since the bit allocation must consider the worst-case signal to noise ratio (SNR) in that period. While short period brings in large transmission overhead, since a packet must be fragmented to fit in one tone map period. Short period also results in large storage overhead for storing more tone maps.

In existing standards, such as IEEE 1901/Homeplug AV, a beacon period, which may be multiple of power line cycles, can be separated into small segments, and each segment can use a different tone map. The tone map for a segment has to consider the worst SNR for each tone. The larger the segment is, the worse SNR can be seen, and the lower the allocation can be. The smaller the segment is the large storage for tone maps is needed. Further, since one packet can use only one tone map, the smaller segment means the shorter packet length, and therefore transmission efficiency is lower. Moreover, tone map resolution has been an important factor for both performance and storage. Without careful design, MAC rate even decreases with PHY rate when resolution increases.

SUMMARY OF THE INVENTION

The present invention therefore provides a method and related communication device for handling tone map interpolation to solve the abovementioned problems.

A method of determining a tone property with a tone index for a transmitter or a receiver in a communication system is disclosed. The method comprises selecting at least one base tone index from a plurality of base tone indices according to at least one relation between the tone index and the at least one base tone index, and generating the tone property according to at least one base tone property with the at least one base tone index of a plurality of base tone properties, and the at least one relation between the tone index and the at least one base tone index; wherein a base tone map comprises the plurality of base tone indices and the plurality of base tone properties.

A communication device of a communication system for handling a tone property with a tone index is disclosed. The communication device comprises a processor for executing a program, a memory for storing data, and a storage device, coupled to the processor storing the program. When executed by the processor, the program instructs the processor to perform steps of selecting at least one base tone index from a plurality of base tone indices according to at least one relation between the tone index and the at least one base tone index, and generating the tone property according to at least one base tone property with the at least one base tone index of a plurality of base tone properties, and the at least one relation between the tone index and the at least one base tone index; wherein a base tone map comprises the plurality of base tone indices and the plurality of base tone properties.

To clarify the usage of tone maps and tone allocation, the tone map in the following context is explained in term of tone map of bit allocation but is not limited to this tone property. The tone property for a tone map of bit allocation is tone allocation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
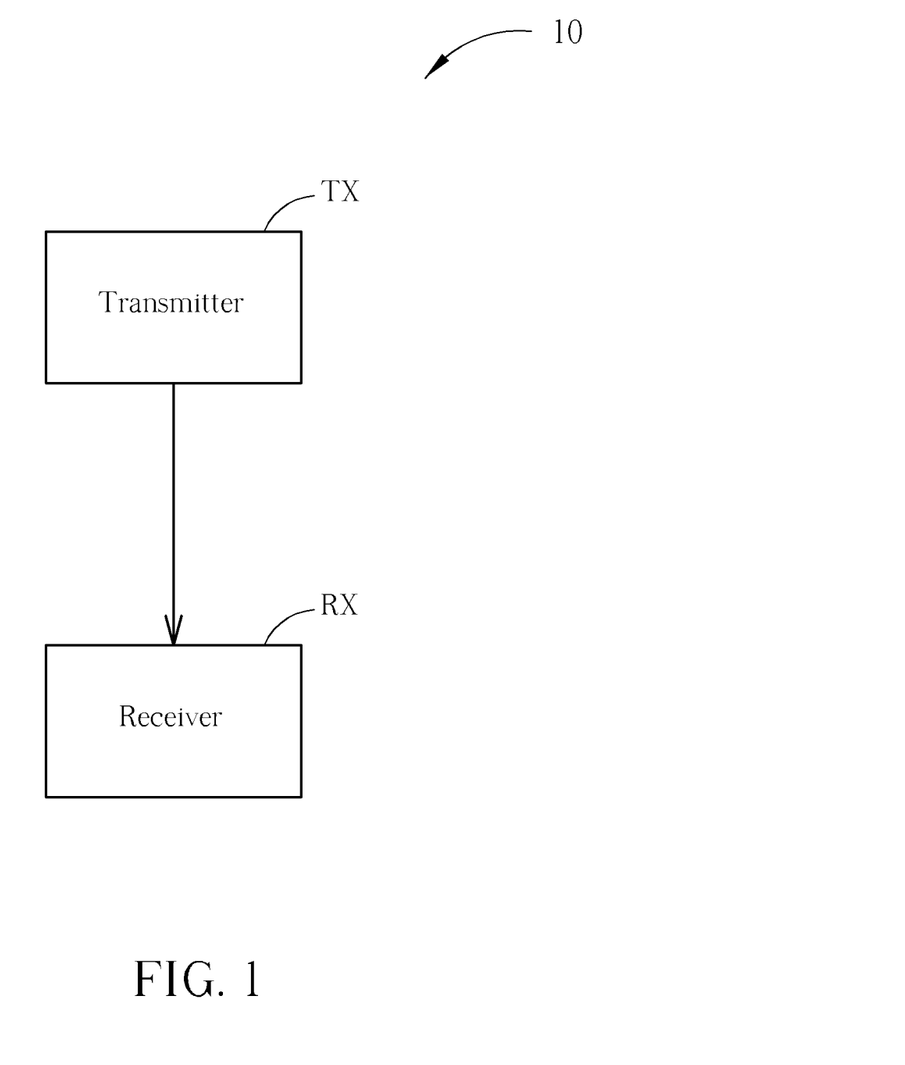
FIG. 1 is a schematic diagram of an exemplary wireless communication system according to the present disclosure.

Please refer to FIG. 1, which is a schematic diagram of a communication system 10 according to an example of the present invention. The communication system 10 is briefly composed of a transmitter TX and a receiver RX. In FIG. 1, the transmitter TX and the receiver RX are simply utilized for illustrating the structure of the communication system 10. Practically, the communication system 10 can be any communication systems employing orthogonal frequency-division multiplexing (OFDM) or discrete multi-tone modulation (DMT). For example, the communication system 10 can be a wireless communication system, such as IEEE 802.11b/g/n, or a wireline communication system, such as an Asymmetric Digital Subscriber Line (ADSL) system or a power line communication (PLC) system. The transmitter TX and the receiver RX can be installed in mobile phones, laptops, tablet computers, electronic books and portable computer systems, and are not limited herein.

Figure 2:
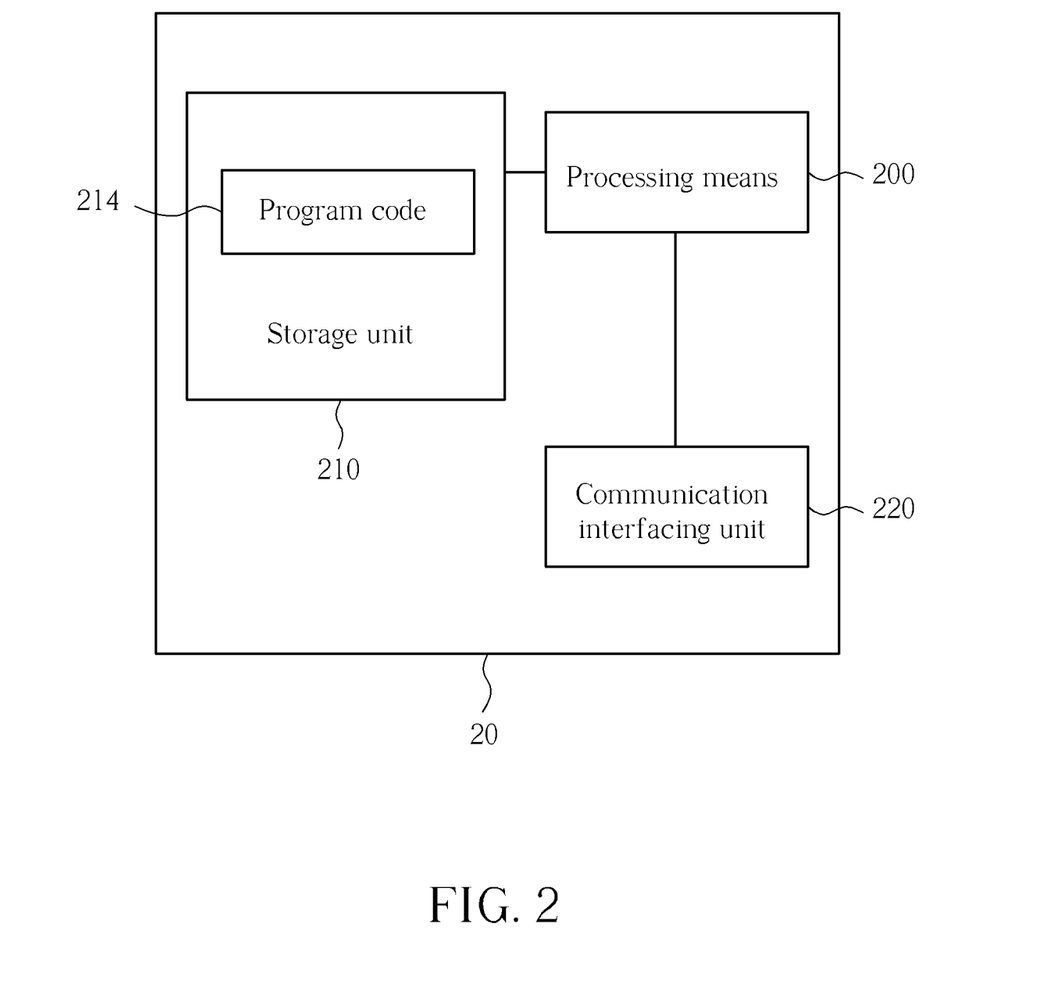
FIG. 2 is a schematic diagram of an exemplary communication device according to the present disclosure.

Please refer to FIG. 2, which is a schematic diagram of a communication device 20 according to an example of the present invention. The communication device 20 can be the transmitter TX or the receiver RX shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed and executed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is used to transmit and receive signals according to processing results of the processor 200.

Figure 3:
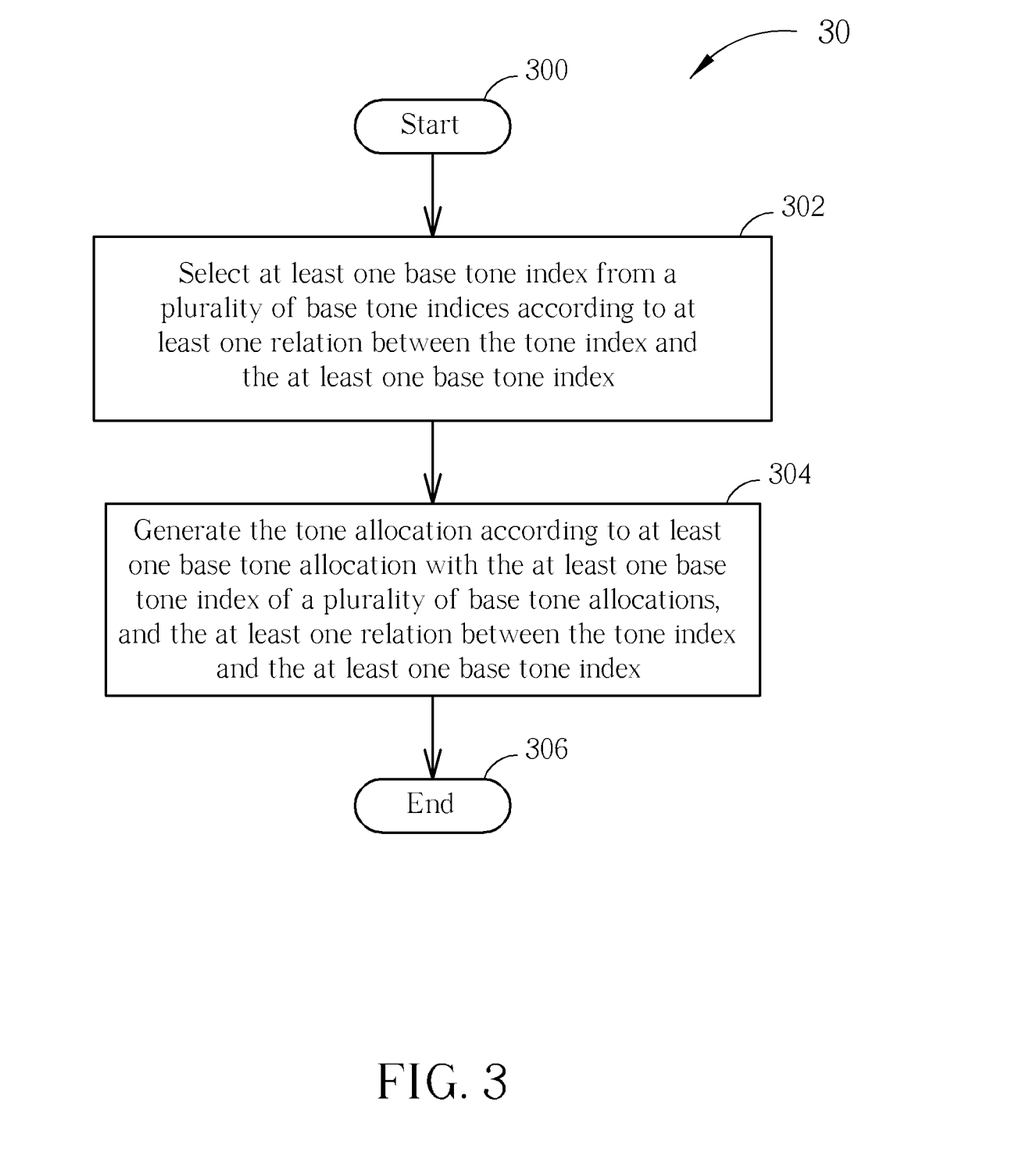
FIG. 3 is a flowchart of an exemplary process according to the present disclosure.

Please refer to FIG. 3, which is a flowchart of a process 30 according to an example of the present invention. The process 30 is utilized in the transmitter TX and the receiver RX of the communication system 10 shown in FIG. 1, to handle a tone map generation of a symbol. The process 30 may be compiled into the program code 214 and includes the following steps:

Step 300: Start.

Step 302: Select at least one base tone index from a plurality of base tone indices according to at least one relation between the tone index and the at least one base tone index.

Step 304: Generate the tone allocation according to at least one base tone allocation with the at least one base tone index of a plurality of base tone allocations, and the at least one relation between the tone index and the at least one base tone index.

Step 306: End.

According to the process 30, for the tone allocation with the tone index in the tone map, the transmitter TX first selects the at least one base tone index from the plurality of base tone indices according to the at least one relation between the tone index and the at least one base tone index. Then, the transmitter TX generates the tone allocation according to at least one base tone allocation with the at least one base tone index of the plurality of base tone allocations, and the at least one relation between the tone index and the at least one base tone index, wherein the base tone map comprises the plurality of base tone indices and the plurality of base tone allocations. The receiver RX follows the same process to generate frequency allocations in the tone map and decode the received symbol.

More specifically, the at least one relation can be at least one distance between the tone index and the at least one base tone index. Therefore, the transmitter TX can select the at least one base tone index which has the smallest distance with the tone index, from the plurality of base tone indices. For the transmitter TX to utilize the base tone map, the base tone map can be stored in the transmitter TX or the receiver RX. Alternatively, the base tone map can be fed back from the receiver RX, or can be indicated by an index fed back from the receiver RX.

Please note that, the tone index and the at least one base tone index can be two-dimension indices. Further, the tone index and the at least one base tone index can be indices in a same time domain or a same frequency domain, i.e., the tone index and the at least one base tone index are in a straight line in a two-dimension space. In other words, a tone index can be a frequency index, a time index or a two-dimension index, and is not limited herein.

Therefore, according to the process 30, the transmitter TX can generate the tone map, and the receiver RX can decode the receiver symbol by using the same process. To be more specific, several examples according to the present invention are illustrated as follows.

Figure 4:
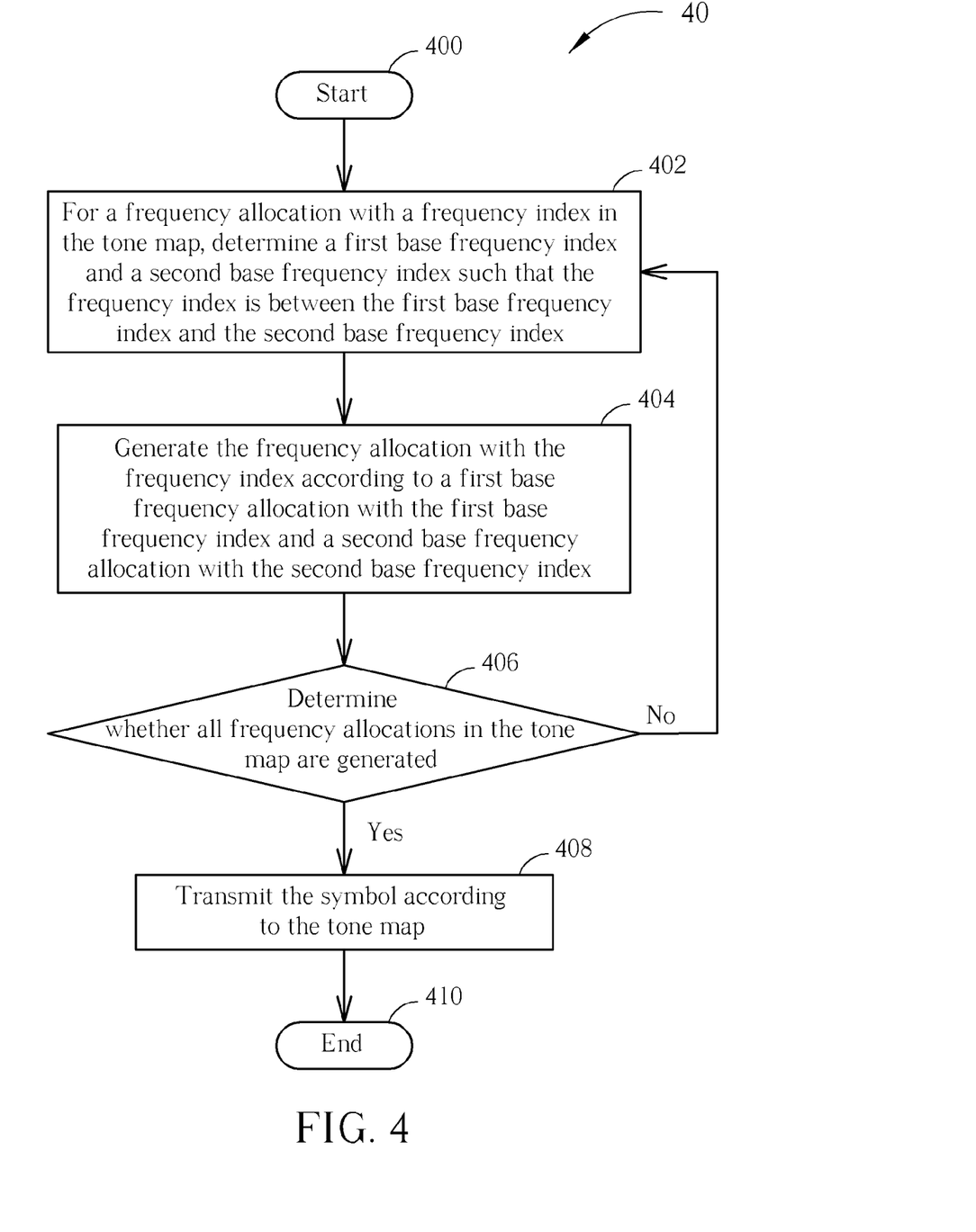
FIG. 4 is a flowchart of an exemplary process according to the present disclosure.

Please refer to FIG. 4, which is a flowchart of a process 40 according to an example of the present invention. The process 40 is utilized in the transmitter TX and the receiver RX of the communication system 10 shown in FIG. 1, to handle a tone map generation of a symbol. The process 40 may be compiled into the program code 214 and includes the following steps:

Step 400: Start.

Step 402: For a frequency allocation with a frequency index in the tone map, determine a first base frequency index and a second base frequency index such that the frequency index is between the first base frequency index and the second base frequency index.

Step 404: Generate the frequency allocation according to a first base frequency allocation with the first base frequency index and a second base frequency allocation with the second base frequency index.

Step 406: Determine whether all frequency allocations in the tone map are generated. If yes, perform step 408, otherwise, perform step 402.

Step 408: Transmit or decode the symbol according to the tone map.

Step 410: End.

According to the process 40, for the frequency allocation with the frequency index in the tone map, the transmitter TX determines the first base frequency index and the second base frequency index such that the frequency index is between the first base frequency index and the second base frequency index. Accordingly, the transmitter TX can generate the frequency allocation according to the first base frequency allocation and the second base frequency allocation. The transmitter TX continues the above operations until all frequency allocations in the tone map are generated, and the symbol can then be transmitted according to the tone map. The receiver RX follows the same process to generate frequency allocations in the tone map and decode the received symbol.

Please note that, the spirit of the process 40 is to generate each frequency allocation according to corresponding neighbor base frequency allocations, and ways for generating the each frequency allocation is not limited herein. For further illustration of the tone map generation, please refer to FIG. 5, which is a schematic diagram of a symbol SB_n with a tone map TM_n and a base tone map BTM_n according to an example of the present invention. The tone map TM_n of the symbol SB_n at a time n includes frequency allocations b(n', k')s, and the frequency allocation b(n',k') is preferably (or relates to) a number of bits which will be allocated to a position with time index n' and frequency index k' (hereafter shortened as the index (n',k')). The base tone map BTM_n is a subset of the tone map TM_n, and includes base frequency allocations at the time n that are known by the transmitter TX. More specifically, base frequency allocations b(n,k1), b(n, k2), b(n,k3) and b(n,k4) of the base tone map TM_n in FIG. 5 with frequency indices k1, k2, k3 and k4, respectively, are represented by squares with diagonal texture. Frequency allocations which are not available are represented by blank squares. Without loss of generality, it is assumed that a value of a frequency index on the frequency axis in FIG. 5 increases from bottom to top, i.e., k1<k2<k3<k4.

Figure 5:
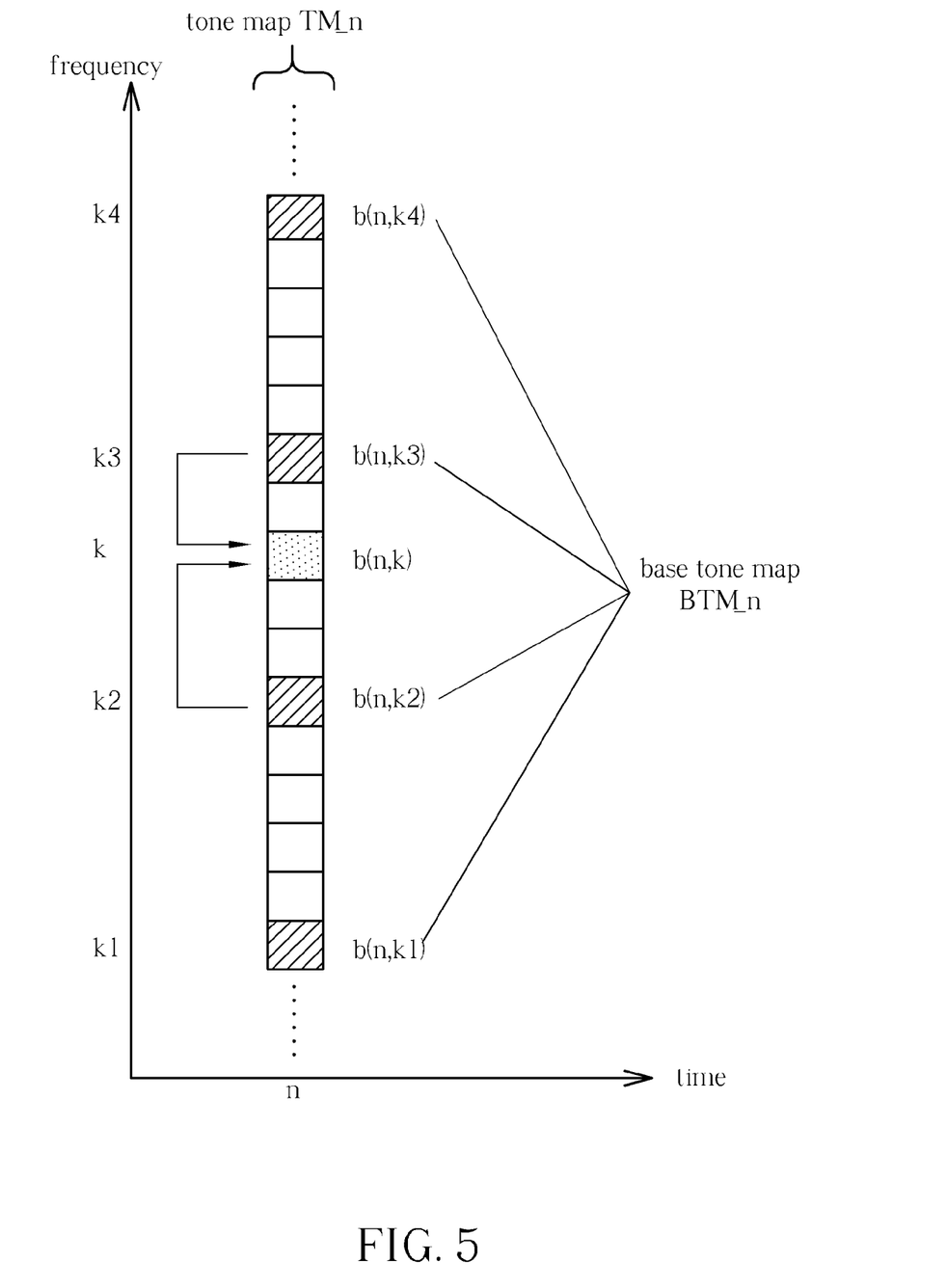
FIG. 5 is a schematic diagram of tone map generation in the frequency domain according to an example of the present disclosure.

Please note that, the frequency allocations and the base frequency allocations shown in FIG. 5 are simply used for illustration, and rest of frequency allocations are not shown for simplicity. In practical, there are more frequency allocations and more base frequency allocations due to a large number of frequency indices, for example, the number may be 256, 512, 1024, etc. Besides, the base tone map BTM_n is usually selected or established based on a principle that a large base frequency allocation b (n',k') corresponds to a large signal-to-noise ratio (SNR) at the index (n',k'), and a small base frequency allocation b (n', k') corresponds to a small SNR at the index (n',k'). The base tone map BTM_n may be known by the transmitter TX, or is fed back by the receiver RX to be used by the transmitter TX. The method of feeding back can be feeding back the base tone map BTM_n or feeding an index to indicate the base tone map BTM_n. Further, for the symbol SB_n to be transmitted, the each frequency allocation of the tone map TM_n must be available or must be generated such that the transmitter TX can allocate bits to each frequency index according to a corresponding frequency allocation.

Take the frequency allocation b(n,k) (dotted square) as an example, the frequency allocation b (n, k) can be obtained by combining the base frequency allocations b(n,k2) and b(n,k3) which are the two nearest base frequency allocations to the frequency allocation b (n, k) (e.g. considering a frequency-domain distance) as shown in FIG. 5. A method base on which the base frequency allocations b(n,k2) and b(n,k3) are combined is not limited. As long as the frequency allocation b(n,k) can be generated relating to a SNR at the index (n,k), i.e., a large SNR at the index (n, k) implies a large frequency allocation b(n,k), and oppositely, a small SNR at the index (n,k) implies a small frequency allocation b(n,k). For example, a linear interpolation based on an inverse distance weighting can be used. The inverse distance weighting weights the base frequency allocation near the frequency allocation b(n,k) by using a large weight, and weights the base frequency allocation far from the frequency allocation b(n,k) by using a small weight. Therefore, according to the inverse distance weighting, the frequency allocation b(n,k) can be generated by using the equation, $b(n,k)=(k3-k)/(k3-k2)\cdot b(n, k2)+(k-k2)/(k3-k2)\cdot b(n, k3)$. After the each frequency allocation of the tone map TM_n is generated, the transmitter TX can allocate bits to the each frequency index according to the corresponding frequency allocation, and transmits the symbol SB_n to the receiver RX. The receiver RX follows the same process to generate frequency allocations in the tone map and decode the received symbol SB_n.

Please note that, the method base on which the base frequency allocations are combined is not limited to the inverse distance weighting. An interpolation is also not limited to the linear interpolation, i.e., a high-order interpolation can also be used. A high-order interpolation may need more adjacent base frequency allocations. Or even a zero-order interpolation can be used, where only one adjacent base frequency allocation is needed in this case. A method for determining the two nearest base frequency allocations to the frequency allocation b(n,k) is not limited. For example, the transmitter TX can first determine the first base frequency allocation (e.g. the base frequency allocation b(n,k2)) with the largest frequency index smaller than the frequency index k, then the next base frequency allocation (e.g. the base frequency allocation b (n, k3)) can be determined as the second base frequency allocation.

Therefore, according to the process 40 and above illustration of FIG. 5, the transmitter TX can generate the tone map TM_n, and allocate bits according to the tone map TM_n. Since the each frequency allocation b(n',k') is generated by combining the two nearest base frequency allocations, the each frequency allocation b (n',k') relates to SNR at the index (n',k') accurately. As a result, more bits are allocated to the index (n',k') with a better SNR, and less bits are allocated to the index (n',k') with a worse SNR. A system throughput of the communication system 10 can approach the system capacity, and the storage and communication overhead is small. In comparison, complete frequency allocations are directly used for all frequency allocations in the prior art, i.e., the frequency allocation spans over the whole range of tones. Therefore, the cost of storing and communicating the tone maps is high.

Figure 6:
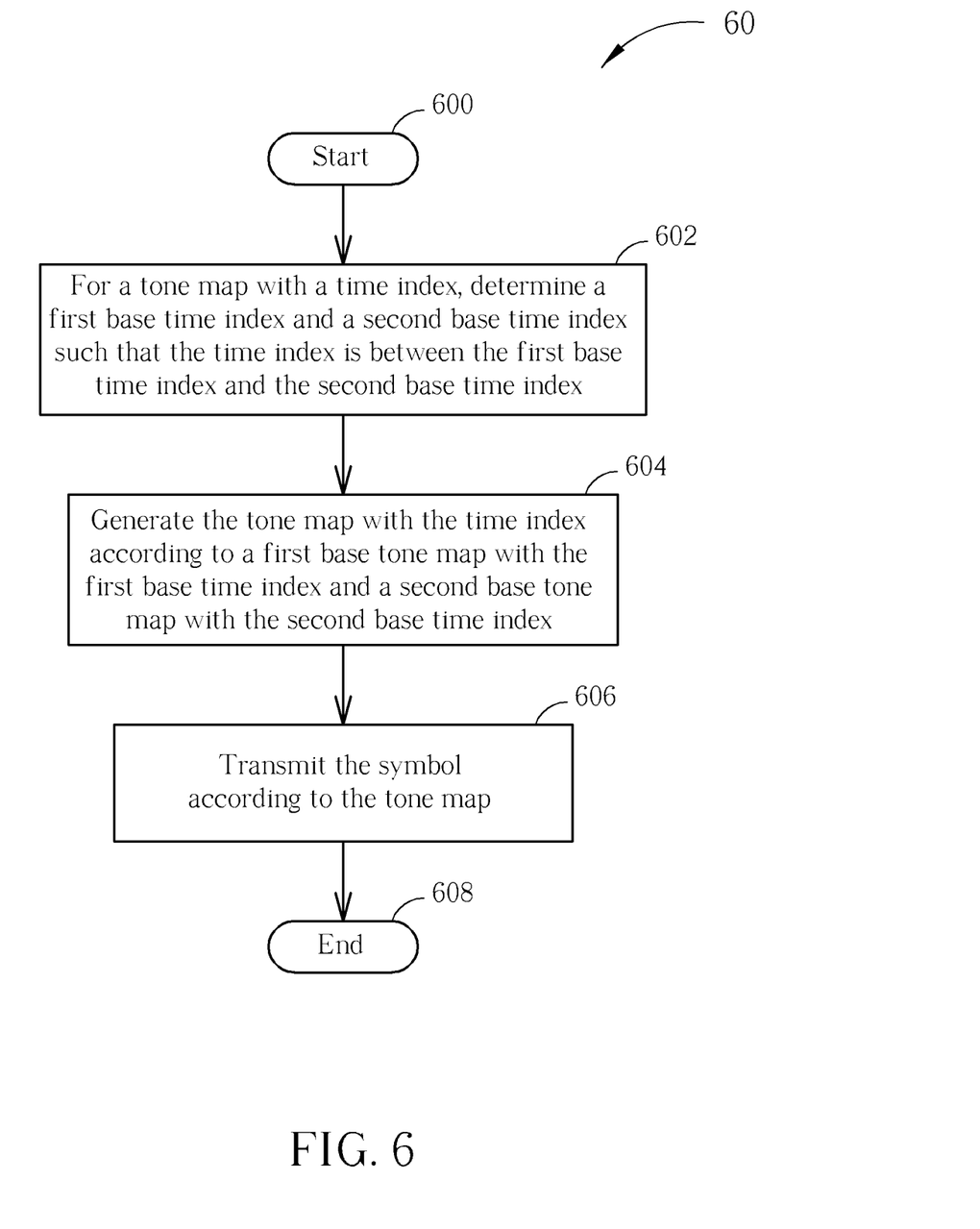
FIG. 6 is a flowchart of an exemplary process according to the present disclosure.

On the other hand, the overhead to describe a time-varying channel is huge. A practical solution is to define tone maps in coarse regions over time. A worst-case tone map is calculated for the worst channel condition in a region of similar channel characteristics. Instead, a time-domain interpolation can better describe the channel condition and help the system throughput of the communication system 10 to approach the system capacity. The approach is illustrated as follows. Please refer to FIG. 6, which is a flowchart of a process 60 according to an example of the present invention. The process 60 is utilized in the transmitter TX and the receiver RX of the communication system 10 shown in FIG. 1, to handle a tone map generation of a symbol. The process 60 may be compiled into the program code 214 and includes the following steps:

Step 600: Start.

Step 602: For a tone map with a time index, determine a first base time index and a second base time index such that the time index is between the first base time index and the second base time index.

Step 604: Generate the tone map with the time index according to a first base tone map with the first base time index and a second base tone map with the second base time index.

Step 606: Transmit or decode the symbol according to the tone map.

Step 608: End.

According to the process 60, for the tone map with the time index, the transmitter TX determines the first base time index and the second base time index such that the time index is between the first base time index and the second base time index. Accordingly, the transmitter TX can generate the tone map with the time index according to the first base tone map and the second base tone map. After the tone map is generated by the transmitter TX, the symbol can be transmitted according to the tone map. The receiver RX follows the same process to generate frequency allocations in the tone map and decode the received symbol.

Please note that, the spirit of the process 60 is to generate the tone map according to neighbor base tone maps, and ways for generating the tone map is not limited herein. For further illustration of the tone map generation, please refer to FIG. 7, which is a schematic diagram of a symbol SB_na with a tone map TM_na, and symbols SB_na1-SBna4 with base tone maps BTM_na1-BTM_na4, respectively, according to an example of the present invention. The tone map TM_na at a time na is full of unknown frequency allocations, and includes no base frequency allocations. The base tone maps BTM_na1-BTM at the times na1-na4, respectively, are full of base frequency allocations that are known by the transmitter TX. Similarly, base frequency allocations are represented by squares with diagonal texture. Frequency allocations which are not available are represented by blank squares. Besides, properties of frequency allocations included the tone map TM_na and base frequency allocations included in the base tone maps BTM_na1-BTM_na4 have been mentioned above, and are ignored for simplicity.

Figure 7:
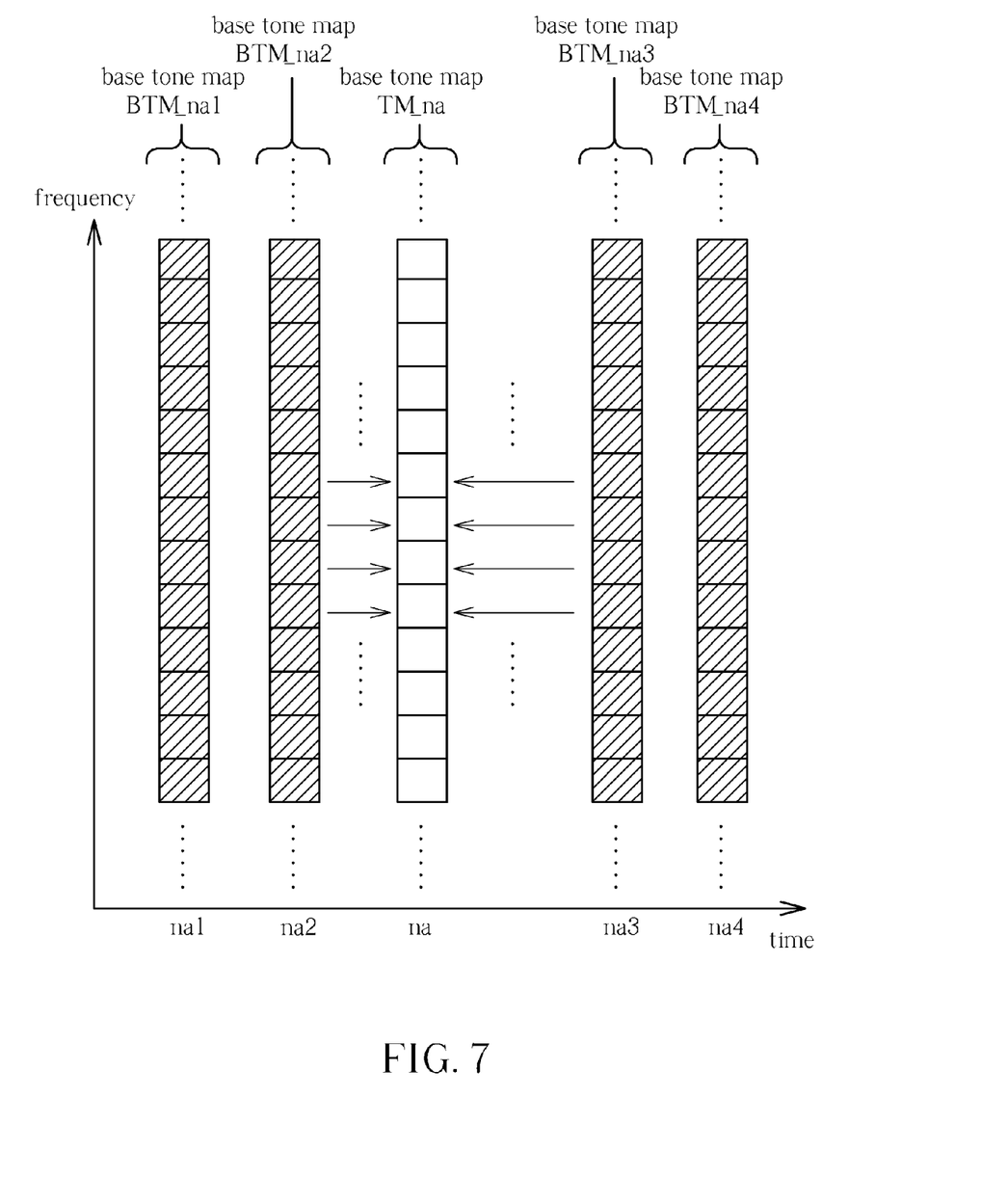
FIG. 7 is a schematic diagram of tone map generation in the time domain according to an example of the present disclosure.

Observing FIG. 7, it is obvious that the tone map TM_na can be obtained by combining the base tone maps BTM_na2 and BTM_na3 which are the two nearest base tone maps to the tone map TM_na (e.g. considering a time-domain distance). A method base on which the base tone maps BTM_na2 and BTM_na3 are combined is not limited. For example, a linear interpolation based on the inverse distance weighting can be used. The inverse distance weighting weights the base tone map near the tone map TM_na by using a large weight, and weights the base tone map far from the tone map TM_na by using a small weight. Therefore, according to the inverse distance weighting, the tone map TM_na can be generated by using the equation, $TM\_na=(na3-na)/(na3-na2) \cdot BTM\_na2+(na-na2)/(na3-na2) \cdot BTM\_na3$. After the tone map TM_na is generated, the transmitter TX can allocate bits to the each frequency index according to the corresponding frequency allocation of the tone map TM_na, and transmits the symbol SB_na to the receiver RX. Similarly, the method base on which the base tone maps are combined is not limited to the inverse distance weighting. An interpolation is also not limited to the linear interpolation, i.e., a zero-order or high-order interpolation can also be used.

Please note that, a combination of the base tone maps BTM_na2 and BTM_na3 implies that a frequency allocation at a frequency index is obtained by using base frequency allocations of the base tone maps BTM_na2 and BTM_na3 at the same frequency index. A method for determining the two nearest base tone maps to the tone map TM_na is not limited. For example, the transmitter TX can first determine the first base tone map (e.g. the base tone map BTM_na2) with the largest base tone index smaller than the time index, then the next base tone map (e.g. the base tone map BTM_na3) can be determined as the second base tone map.

Therefore, according to the process 60 and above illustration of FIG. 7, the transmitter TX can generate the tone map TM_na, and allocate bits according to the tone map TM_na. Since the tone map TM_na is generated by combining the two nearest base tone maps, the each frequency allocation of the tone map TM_na relates to SNR accurately. As a result, more bits are allocated to the frequency index with a better SNR, and less bits are allocated to the frequency index with a worse SNR. A system throughput of the communication system 10 can approach the system capacity.

Figure 8:
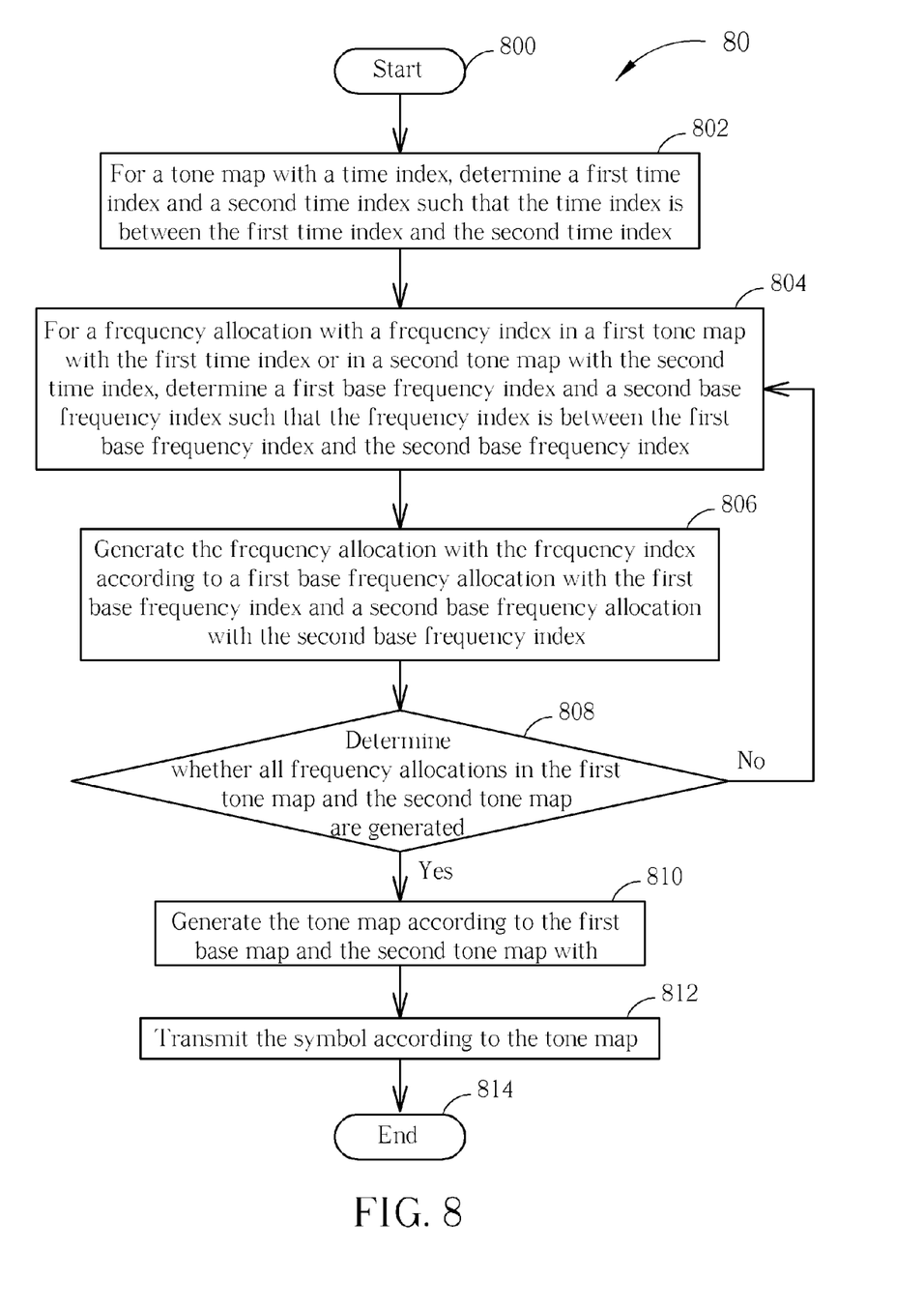
FIG. 8 is a flowchart of an exemplary process according to the present disclosure.

Furthermore, if there is no base tone map full of base frequency allocations near a tone map, the processes 40 and 60 can be jointly applied to generate the tone map. Please refer to FIG. 8, which is a flowchart of a process 80 according to an example of the present invention. The process 80 is utilized in the transmitter TX and the receiver RX of the communication system 10 shown in FIG. 1, to handle a tone map generation of a symbol. The process 80 may be compiled into the program code 214 and includes the following steps:

Step 800: Start.

Step 802: For a tone map with a time index, determine a first time index and a second time index such that the time index is between the first time index and the second time index.

Step 804: For a frequency allocation with a frequency index in a first tone map with the first time index or in a second tone map with the second time index, determine a first base frequency index and a second base frequency index such that the frequency index is between the first base frequency index and the second base frequency index.

Step 806: Generate the frequency allocation with the frequency index according to a first base frequency allocation with the first base frequency index and a second base frequency allocation with the second base frequency index.

Step 808: Determine whether all frequency allocations in the first tone map and the second tone map are generated. If yes, perform step 810, otherwise, perform step 804.

Step 810: Generate the tone map according to the first base map and the second tone map with.

Step 812: Transmit or decode the symbol according to the tone map.

Step 814: End.

According to the process 80, for the tone map with the time index, the transmitter TX determines the first time index and the second time index such that the time index is between the first time index and the second time index. For each frequency allocation with corresponding frequency index in the first tone map, the transmitter TX determines a first base frequency index and a second base frequency index such that the frequency index is between the first base frequency index and the second base frequency index. Accordingly, the transmitter TX can generate the each frequency allocation with the corresponding frequency index according to a first base frequency allocation with the first base frequency index and a second base frequency allocation with the second base frequency index. Therefore, the first tone map is generated. Similarly, the transmitter TX can generate each frequency allocation with corresponding frequency index in the second tone map, and the second tone map is generated. Then, the transmitter TX can generate the tone map according to the first tone map and the second tone map. The symbol can be transmitted according to the tone map. The receiver RX follows the same process to generate frequency allocations in the tone map and decode the received symbol.

Please note that, the process 40 and the process 60 are used in the process 80, to obtain a tone map. For further illustration of the tone map generation, please refer to FIG. 9, which is a schematic diagram of a symbol SB_nb with a tone map TM_nb, and symbols SB_nb1-SBnb4 with tone maps TM_nb1-TM_nb4, respectively, according to an example of the present invention. The tone map TM_na at a time na includes is full of unknown frequency allocations, and includes no base frequency allocations. The tone maps TM_na1-TM at the times nb1-nb4, respectively, includes both unknown frequency allocations and base frequency allocations which constructing corresponding base tone maps. Similarly, base frequency allocations are represented by squares with diagonal texture. Frequency allocations which are not available are represented by blank squares. Besides, properties of frequency allocations included the tone map TM_na, and tone maps TM_nb1-TM_nb4 have been mentioned above, and are ignored for simplicity.

Figure 9:
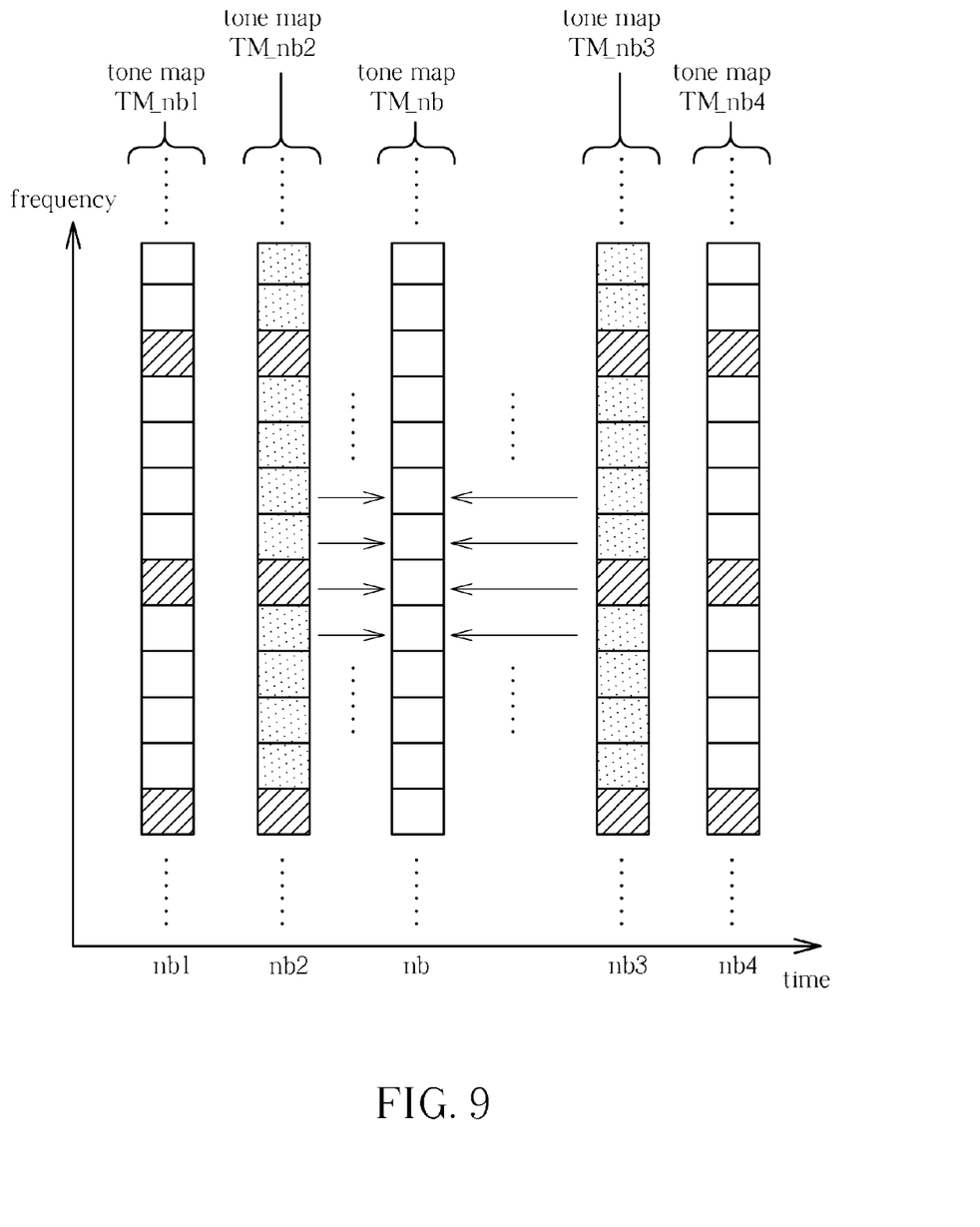
FIG. 9 is a schematic diagram of tone map generation in both the time domain and the frequency domain according to an example of the present disclosure.

Observing FIG. 9, it is obvious that the tone map TM_nb can be obtained by combining the tone maps TM_nb2 and TM_nb3 which are the two nearest tone maps to the tone map TM_nb (e.g. considering a time-domain distance). However, most frequency allocations of the tone maps TM_nb2 and TM_nb3 are unknown and should be generated first. Therefore, the process 40 and accompanying illustrations can be used to generate the frequency allocations (doted squares) of the tone maps TM_nb2 and TM_nb3. After the tone maps TM_nb2 and TM_nb3 are generated, the process 60 and accompanying illustrations can be used to generate the tone map TM_nb.

Therefore, according to the process 80 and above illustration of FIG. 9, the transmitter TX can generate the tone map TM_nb, and allocate bits according to the tone map TM_nb. Since the tone map TM_nb is generated by combining the two nearest tone maps, each frequency allocation of the tone map TM_nb relates to SNR accurately. As a result, more bits are allocated to the frequency index with a better SNR, and less bits are allocated to the frequency index with a worse SNR. A system throughput of the communication system 10 can approach the system capacity.

Figure 10:
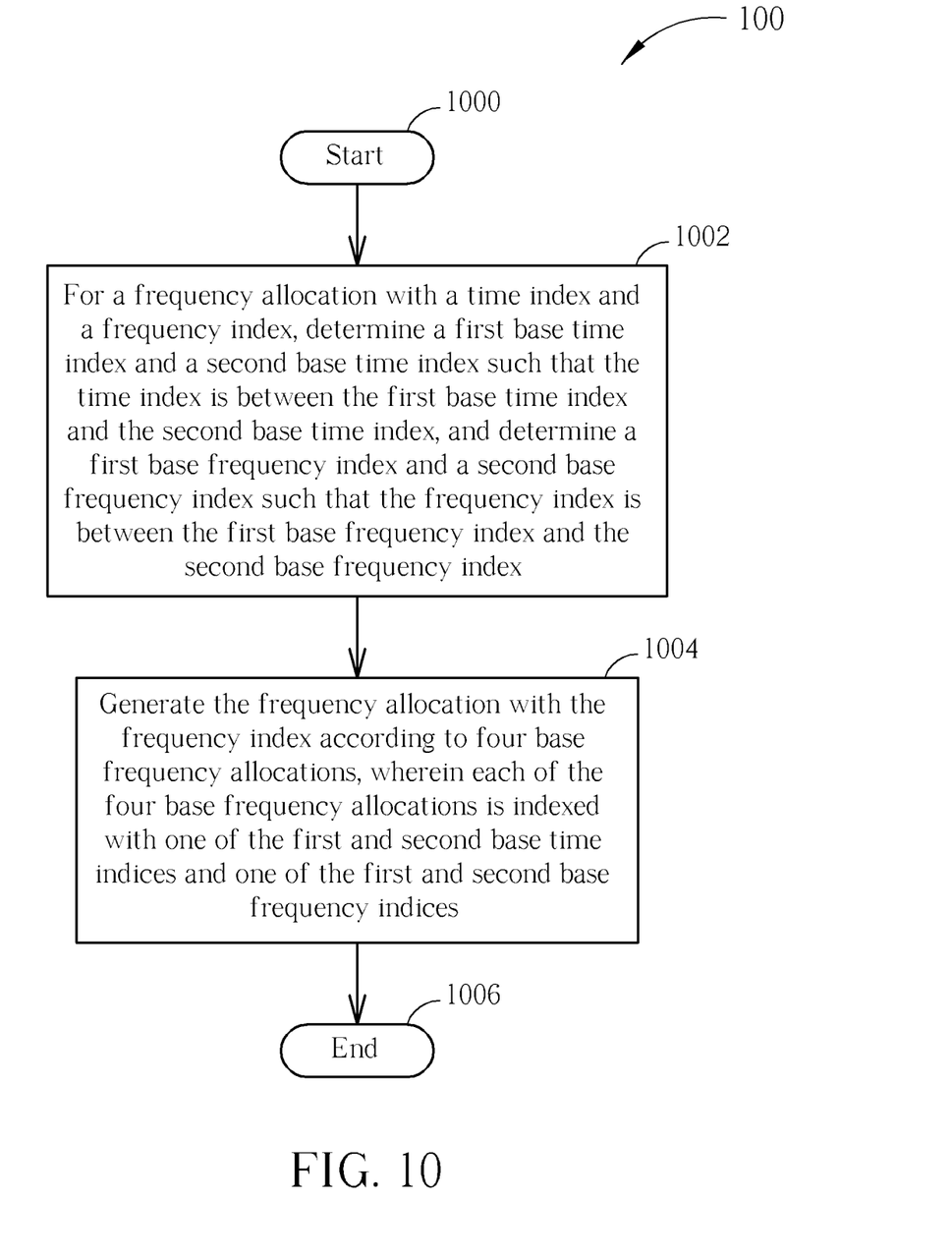
FIG. 10 is a flowchart of an exemplary process according to the present disclosure.

Furthermore, a frequency allocation can also be obtained by using four neighbor base frequency allocations of neighbor base tone maps, and a better accuracy can be achieved. Please refer to FIG. 10, which is a flowchart of a process 100 according to an example of the present invention. The process 100 is utilized in the transmitter TX and the receiver RX of the communication system 10 shown in FIG. 1, to handle a frequency allocation of a symbol. The process 100 may be compiled into the program code 214 and includes the following steps:

Step 1000: Start.

Step 1002: For a frequency allocation with a time index and a frequency index, determine a first base time index and a second base time index such that the time index is between the first base time index and the second base time index, and determine a first base frequency index and a second base frequency index such that the frequency index is between the first base frequency index and the second base frequency index.

Step 1004: Generate the frequency allocation with the frequency index according to four base frequency allocations, wherein each of the four base frequency allocations is indexed with one of the first and second base time indices and one of the first and second base frequency indices.

Step 1006: End.

According to the process 100, for the frequency allocation with the time index and the frequency index, the transmitter TX determines the first base time index and the second base time index such that the time index is between the first base time index and the second base time index, and determines the first base frequency index and the second base frequency index such that the frequency index is between the first base frequency index and the second base frequency index. Accordingly, the transmitter TX can generate the frequency allocation according to the four base frequency allocations, wherein each of the four base frequency allocations is indexed with one of the first and second base time indices and one of the first and second base frequency indices. The receiver RX follows the same process to generate frequency allocations in the tone map and decode the received symbol.

Please note that, the spirit of the process 100 is to generate the frequency allocation according to the four neighbor base frequency allocations, and ways for generating the frequency allocation is not limited herein. For further illustration of the frequency allocation generation, please refer to FIG. 11, which is a schematic diagram of a symbol SB_nc with a tone map TM_nc and two base tone maps BTM_nc1 and BTM_nc2 according to an example of the present invention.

Figure 11:
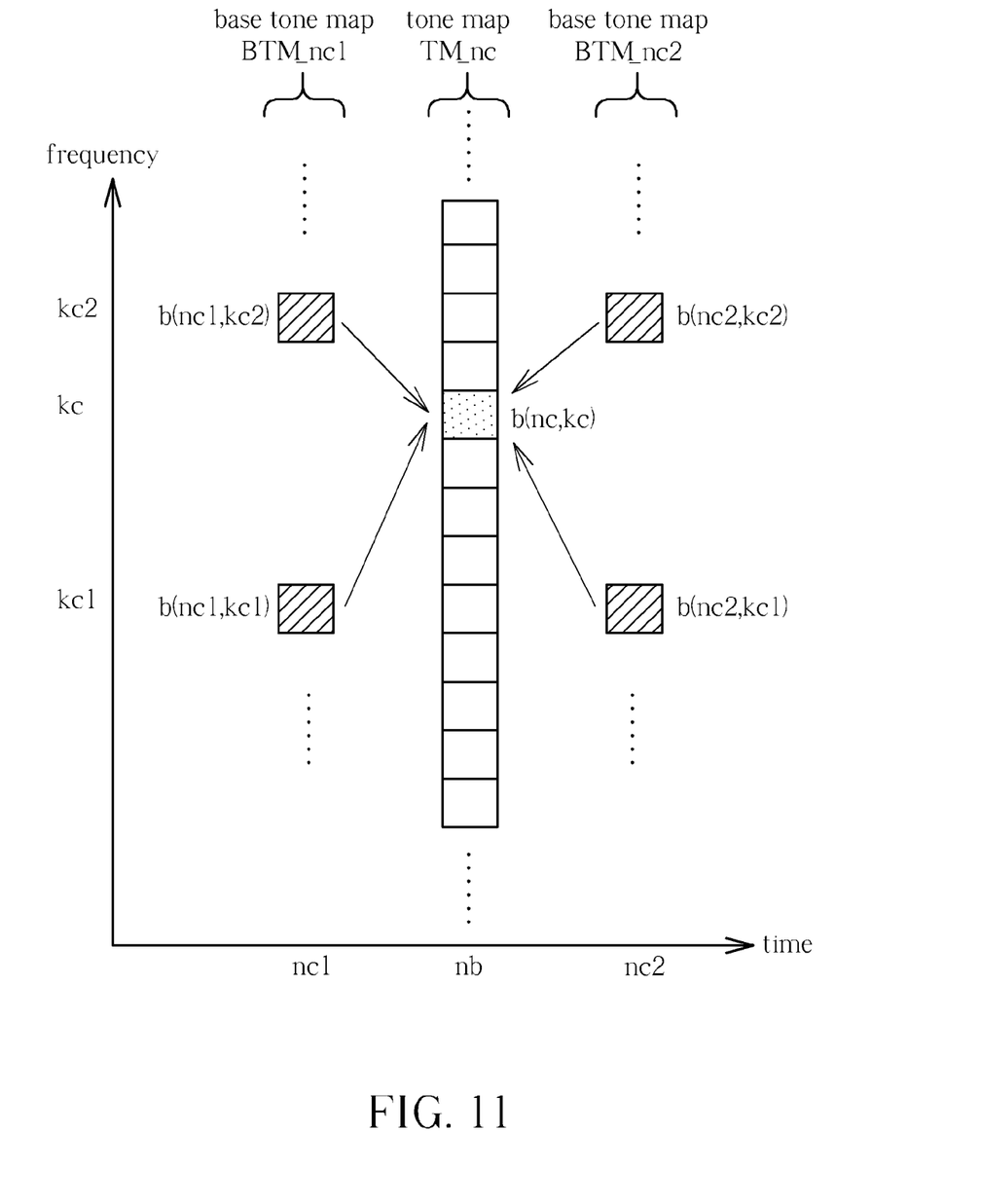
FIG. 11 is a schematic diagram of frequency allocation generation in both the time domain and the frequency domain according to an example of the present disclosure.

The tone map TM_nc of the symbol SB_nc at a time nc comprises a frequency allocation b (nc, kc), and the frequency allocation b (nc, kc) is preferably (or relates to) a number of bits which will be allocated to the index (n', k'). The base tone maps BTM_nc1 and BTM_nc2 include base frequency allocations at a time nc1 and a time nc2, respectively, and are known by the transmitter TX. More specifically, the base tone map BTM_nc1 and BTM_nc2 are the two nearest base tone maps to the tone map TM_nc (e.g. considering a time-domain distance) as shown in FIG. 11. The base tone map BTM_nc1 includes multiple base frequency allocations, wherein base frequency allocations b (nc1, kc1) and b (nc1, kc2) are the two nearest frequency allocations to the frequency allocation b(nc,kc) (e.g. considering both the time-domain distance and a frequency-domain distance, i.e., a 2-dimension distance). The base tone map BTM_nc2 also includes multiple base frequency allocations, wherein base frequency allocations b (nc2, kc1) and b(nc2,kc2) are the two nearest frequency allocations to the frequency allocation b(nc,kc) (e.g. considering both the time-domain distance and the frequency-domain distance, i.e., the 2-dimension distance). The base frequency allocations are represented by squares with diagonal texture. Frequency allocations which are not available are represented by blank squares.

Take the frequency allocation b(nc,kc) (dotted square) as an example, the frequency allocation b(nc,kc) can be obtained by combining the base frequency allocations b (nc1, kc1), b (nc1, kc2), b (nc2, kc1) and b(nc2,kc2) which are the four nearest base frequency allocations to the frequency allocation b(nc,kc) as shown in FIG. 11. A method base on which the base frequency allocations b (nc1, kc1), b (nc1, kc2), b (nc2, kc1) and b(nc2,kc2) are combined is not limited. As long as the frequency allocation b (nc,kc) can be generated relating to a SNR at the index (nc,kc), i.e., a large SNR at the index (nc,kc) implies a large frequency allocation b (nc,kc), and oppositely, a small SNR at the index (nc,kc) implies a small frequency allocation b (nc,kc). For example, a linear interpolation based on an inverse distance weighting can be used. The inverse distance weighting weights the base frequency allocation near the frequency allocation b(nc,kc) by using a large weight, and weights the base frequency allocation far from the frequency allocation b(nc,kc) by using a small weight. After the frequency allocation b(nc,kc) is generated, the transmitter TX can allocate bits to the frequency index (nc,kc) according to the frequency allocation b (nc, kc). Since the frequency allocation b (nc, kc) is generated by combining the four nearest base frequency allocations, the transmitter TX can allocate bits to the index (nc,kc) with an improved accuracy.

Please note that, the method base on which the base frequency allocations are combined is not limited to the inverse distance weighting. An interpolation is also not limited to the linear interpolation, i.e., a zero-order or high-order interpolation can also be used. A method for determining the two nearest base frequency allocations to the frequency allocation b(nc,kc) is not limited.

In conclusion, the present invention proposes methods for the transmitter or the receiver to estimate unknown tone-specific information (such as frequency allocations) by using neighbor base frequency allocations of one or multiple known by the transmitter. After each frequency allocation of a tone map is generated, the transmitter or the receiver can allocate or decode bits according to the tone map, respectively. In this situation, a corresponding symbol can be transmitted such that system throughput can approach system capacity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a tone allocation with a tone index, utilized in a communication device of a communication system, the method comprising:
the communication device selecting at least one base tone index from a plurality of base tone indices according to at least one relation between the tone index and the at least one base tone index; and
the communication device generating the tone allocation according to at least one base tone allocation with the at least one base tone index of a plurality of base tone allocations, and the at least one relation between the tone index and the at least one base tone index by using interpolation to interpolate the tone allocation from the at least one base tone allocation according to the at least one relation;
wherein a base tone map comprises the plurality of base tone indices and the plurality of base tone allocations;
wherein the communication device is a transmitter or a receiver in the communication system.

2. The method of claim 1, wherein the at least one relation is at least one distance between the tone index and the at least one base tone index.

3. The method of claim 2, wherein selecting the at least one base tone index from the plurality of base tone indices according to the at least one relation between the tone index and the at least one base tone index, comprises:
the communication device selecting the at least one base tone index which has the smallest distance from the tone index, from the plurality of base tone indices.

4. The method of claim 1, further comprising:
the communication device selecting a first base tone index and a second base tone index from the plurality of base tone indices such that the tone index is between the first base tone index and the second base tone index; and
the communication device generating the tone allocation with the tone index according to a first base tone allocation with the first base tone index and a second base tone allocation with the second base tone index of the plurality of base tone allocations.

5. The method of claim 4, wherein determining the first base tone index and the second base tone index from the plurality of base tone indices such that the tone index is between the first base tone index and the second base tone index, comprises:
the communication device selecting the first base tone index from the plurality of base tone indices such that the first base tone index is the largest base tone index smaller than the tone index; and
the communication device selecting the second base tone index from the plurality of base tone indices such that the second base tone index is the smallest base tone index larger than the tone index.

6. The method of claim 4 further comprising
the communication device selecting a third base tone index and a fourth base tone index from the plurality of base tone indices such that the tone index is between the third base tone index and the fourth base tone index; and
the communication device generating the tone allocation with the tone index according to the first base tone allocation, the second base tone allocation, a third base tone allocation with the third base tone index and a fourth base tone allocation with the fourth base tone index of the plurality of base tone allocations.

7. The method of claim 1, wherein generating the tone allocation with the tone index according to the at least one base tone allocation with the at least one base tone index of the plurality of base tone allocations, comprises:
the communication device obtaining at least one contribution from the at least one base tone allocation according to the at least one relation between the tone index and the at least one base tone index; and
the communication device generating the tone allocation with the tone index according to the at least one contribution.

8. The method of claim 1, wherein the base tone map is stored in the transmitter or the receiver.

9. The method of claim 1, wherein the base tone map is fed back from the receiver.

10. The method of claim 1, wherein the base tone map is indicated by an index fed back from the receiver.

11. The method of claim 1, wherein the tone allocation and the at least one base tone allocation relate to numbers of bits allocated to the tone index and the at least one base tone index, respectively.

12. The method of claim 1, wherein the tone index and the at least one base tone index are on a same time domain, or are on a same frequency domain.

13. The method of claim 1, wherein the tone index and the at least one base tone index are two-dimension indices.

14. The method of claim 1, wherein the tone index and the at least one base tone index are on a straight line.

15. A communication device of a communication system for handling a tone allocation with a tone index, the communication device comprising:
a processor for executing a program;
a memory for storing data; and
a storage device, coupled to the processor storing the program; wherein when executed by the processor, the program instructs the processor to perform the following steps:
selecting at least one base tone index from a plurality of base tone indices according to at least one relation between the tone index and the at least one base tone index; and
generating the tone allocation according to at least one base tone allocation with the at least one base tone index of a plurality of base tone allocations, and the at least one relation between the tone index and the at least one base tone index by using interpolation to interpolate the tone allocation from the at least one base tone allocation according to the at least one relation;

wherein a base tone map comprises the plurality of base tone indices and the plurality of base tone allocations.

16. The communication device of claim 15, wherein the at least one relation is at least one distance between the tone index and the at least one base tone index.

17. The communication device of claim 16, wherein selecting the at least one base tone index from the plurality of base tone indices according to the at least one relation between the tone index and the at least one base tone index, comprises:

selecting the at least one base tone index which has the smallest distance with the tone index, from the plurality of base tone indices.

18. The communication device of claim 15, further comprising:

selecting a first base tone index and a second base tone index from the plurality of base tone indices such that the tone index is between the first base tone index and the second base tone index; and generating the tone allocation with the tone index according to a first base tone allocation with the first base tone index and a second base tone allocation with the second base tone index of the plurality of base tone allocations.

19. The communication device of claim 18, wherein determining the first base tone index and the second base tone index from the plurality of base tone indices such that the tone index is between the first base tone index and the second base tone index, comprises:

selecting the first base tone index from the plurality of base tone indices such that the first base tone index is the largest base tone index smaller than the tone index; and selecting the second base tone index from the plurality of base tone indices such that the second base tone index is the smallest base tone index larger than the tone index.

20. The communication device of claim 18 further comprising selecting a third base tone index and a fourth base tone index from the plurality of base tone indices such that the tone index is between the third base tone index and the fourth base tone index; and generating the tone allocation with the tone index according to the first base tone allocation, the second base tone allocation, a third base tone allocation with the third base tone index and a fourth base tone allocation with the fourth base tone index of the plurality of base tone allocations.

21. The communication device of claim 15, wherein generating the tone allocation with the tone index according to the at least one base tone allocation with the at least one base tone index of the plurality of base tone allocations, comprises:

obtaining at least one contribution from the at least one base tone allocation according to the at least one relation between the tone index and the at least one base tone index; and generating the tone allocation with the tone index according to the at least one contribution.

22. The communication device of claim 15, wherein the base tone map is stored in the communication device, or another communication device of the communication system with which the communication device communicates.

23. The communication device of claim 15, wherein the base tone map is fed back from another communication device of the communication system.

24. The communication device of claim 15, wherein the base tone map is indicated by an index fed back from another communication device of the communication system.

25. The communication device of claim 15, wherein the tone allocation and the at least one base tone allocation relate to numbers of bits allocated to the tone index and the at least one base tone index, respectively.

26. The communication device of claim 15, wherein the tone index and the at least one base tone index are on a same time domain, or are on a same frequency domain.

27. The communication device of claim 15, wherein the tone index and the at least one base tone index are two-dimension indices.

28. The communication device of claim 15, wherein the tone index and the at least one base tone index are on a straight line.

* * * * *